(12) United States Patent
Murray (10) Patent No.: US 7,662,297 B2
(45) Date of Patent: Feb. 16, 2010

(54) METHOD OF AND APPARATUS FOR SEPARATION OF SCUM FROM A LIQUID

(76) Inventor: Bradley Desmond Leslie Murray, 10 Mollison Street, West End, QLD 4101 (AU)

( * ) Notice: Subject to any disclaimer, the term of this patent is extended or adjusted under 35 U.S.C. 154(b) by 135 days.

(21) Appl. No.: 11/632,430

(22) PCT Filed: Jul. 13, 2005

(86) PCT No.: PCT/AU2005/001026

§ 371 (c)(1),
(2), (4) Date: Aug. 27, 2007

(87) PCT Pub. No.: WO2006/005132

PCT Pub. Date: Jan. 19, 2006

(65) Prior Publication Data

US 2008/0296235 A1    Dec. 4, 2008

(30) Foreign Application Priority Data

Jul. 13, 2004    (AU) .............................. 2004903828

(51) Int. Cl.
*B01D 17/025* (2006.01)
*C02F 1/40* (2006.01)

(52) U.S. Cl. ...................... 210/776; 210/800; 210/523; 210/540

(58) Field of Classification Search .................. 210/776, 210/800, 804, 221.1, 221.2, 242.1, 242.3, 210/523, 525, 540
See application file for complete search history.

(56) References Cited

U.S. PATENT DOCUMENTS 1,946,663 A * 2/1934 Bchnke ...................... 210/523

2,267,086 A * 12/1941 Donohue ...................... 210/523

(Continued)

FOREIGN PATENT DOCUMENTS

IE    20000638    10/2001

(Continued)

OTHER PUBLICATIONS

International Search Report mailed Aug. 11, 2005 by the Australian Patent Office in counterpart foreign application No. PCT/AU2005/001026 and the International Preliminary Report on Patentability issued on Jan. 16, 2007 by the World Intellectual Property Office in counterpart foreign application No. PCT/AU2005/001026.

*Primary Examiner*—Christopher Upton
(74) *Attorney, Agent, or Firm*—Abelman, Frayne & Schwab (57) ABSTRACT

Apparatus for the separation of scum from a liquid including a housing (22) incorporating two side walls in spaced relationship and a scraper wall disposed between said side walls. A rotational device (12) mounted in the housing (22) provides rotational motion about one or more horizontal axes. The rotational device (12) includes one or more paddles (13-16) which extend outwardly with respect to the rotation axis forming a substantial sealing engagement with the opposed inner faces of the side walls of the housing. The scraper wall and rotational device are arranged such that when immersed in water, the paddle(s) (13-16) may be rotated to become at least partly submerged and the outer periphery(ies) engage with the scraper wall to lift a portion of the water and scum above the natural level of the water.

13 Claims, 7 Drawing Sheets

U.S. PATENT DOCUMENTS

| | | | | |
|---|---|---|---|---|
| 2,491,912 A | * | 12/1949 | Walker | 210/525 |
| 2,822,928 A | | 2/1958 | Wormser et al. | |
| 3,447,683 A | * | 6/1969 | Luce, Jr. | 210/776 |
| 3,613,891 A | * | 10/1971 | Cloutier | 210/242.3 |
| 3,891,558 A | * | 6/1975 | Condit, Jr. | 210/526 |
| 4,151,081 A | * | 4/1979 | Bolli et al. | 210/776 |
| 4,184,967 A | * | 1/1980 | Krofta | 210/525 |
| 5,091,083 A | | 2/1992 | Meylor et al. | |
| 5,158,679 A | * | 10/1992 | Brock | 210/523 |
| 5,968,353 A | * | 10/1999 | Herbert et al. | 210/523 |
| 6,136,191 A | * | 10/2000 | Gribble et al. | 210/523 |
| 6,328,888 B1 | * | 12/2001 | Hines | 210/540 |
| 6,364,123 B1 | * | 4/2002 | Suhr et al. | 210/523 |

FOREIGN PATENT DOCUMENTS

| | | |
|---|---|---|
| SU | 823301 | 4/1981 |
| SU | 1404118 | 6/1988 |

\* cited by examiner

METHOD OF AND APPARATUS FOR SEPARATION OF SCUM FROM A LIQUID

FIELD OF INVENTION

THIS INVENTION relates to a method of and apparatus for the separation of scum from a liquid. The invention has particular application to separation of scum created by aerobic digestion of waste water. The invention may also have application to the separation of the foam or froth phase formed by dispersed or dissolved air flotation used in, for example, waste water treatment. It will be appreciated that the invention is not limited to treatment of waste water. It will also be appreciated that the invention is applicable to liquids other than water.

BACKGROUND ART

The formation of foam or scum on the surface of a liquid is becoming more of a problem in waters effluent from aerobic digestion and other liquid processing operations. Dispersed air is sometimes used in the treatment of waste water in order to facilitate oxygenation, thereby avoiding stagnation of the water. Such a process often produces a scum which floats on the water. The water left after scum removal is sometimes suitable for discharge into receiving waters. The scum removed may be further treated to form a sludge, sometimes including biological treatment, before being transported to a dump site. The location of the dump site can be a considerable distance from the waste water treatment plant. As a result, transport costs can be unnecessarily high and/or digestion of the sludge can be made more difficult unless the bulk of the sludge is decreased, such as by dewatering and/or drying. The sludge itself is sometimes a difficult material to handle, creating problems of its own, such as clinging to drain channel surfaces, and carrying over a volume of air from the aeration of the wastewater.

If scum is discharged, it can cause problems due to the relatively high solids content of the scum. If too much scum is included with the waster proceeding to the clarification stage, final clarification may be made more difficult. Breaking the foam structure of the scum is sometimes suggested as a desirable process, but usually requires the addition of another process step and attendant costs of same.

The term "sludge" is sometimes used in the art to refer to the scum floating on the surface of the liquid, and sometimes to the thickened or dewatered scum. Other terms, such as spume or head may be used, but in this specification, the term "sludge" refers to the thickened scum formed as a result of dewatering the scum unless the context requires otherwise.

British Patent No. 2,193,113 discloses a harvester for harvesting floating matter, such as floating weeds or scum from water by a series of paddles mounted between two substantially parallel running endless chains. However, the harvester disclosed has relatively complex mechanical elements immersed in water which results in relatively high maintenance costs.

The present invention aims to provide a method of and apparatus for the separation of scum from a liquid which alleviates one or more of the disadvantages of the prior art. Other aims and advantages of the invention may become apparent from the following description.

DISCLOSURE OF THE INVENTION

With the foregoing in view, this invention in one aspect resides broadly in apparatus for the separation of scum from a liquid including:

a housing incorporating two side walls in spaced relationship and each having an inner face facing the inner face of the other side wall substantially parallel to one another and a scraper wall disposed between said side walls;

a rotational device mounted in said housing for providing substantially rotational motion about one or more substantially horizontal axes;

said rotational device including one or more paddles extending outwardly with respect to said axis or axes, each said paddle being formed to provide substantial sealing engagement with the opposed inner faces of the side walls of the housing, the or each paddle terminating in an outward periphery, and said rotational device being rotatable to provide rotation of the paddles about a rotational locus;

said scraper wall being arranged to form a corresponding locus in spaced relationship with respect to a portion of the locus of said paddles and extending between said side walls;

the relative disposition rotational device with respect to the housing being such that upon rotation of the paddles within the housing the outer periphery of the or each paddle engages with the inner face of said scraper wall to provide selected sealing engagement therewith;

the scraper wall and rotational device being arranged such that when immersed in water having scum floating thereon, the paddle or paddles may be rotated to become at least partly submerged and the outer periphery or peripheries thereof engage with the scraper wall to lift a portion of the water and scum above the natural level of the water, the selected sealing engagement being selected to provide at least partial dewatering of the scum and water being lifted by the or each paddle between the opposed inner faces of the side walls by the rotation of the paddles in use.

Preferably, the rotational locus is selected to provide an increase in depth of the water as it is in use being lifted.

In another aspect, the invention resides broadly in apparatus for the separation of scum from a liquid including:

a housing incorporating:

two side walls substantially parallel to one another and each having an inner face facing the other and a scraper wall disposed between said side walls;

a rotational device mounted in said housing for providing substantially rotational motion about one or more substantially horizontal axes;

said rotational device including one or more paddles extending outwardly with respect to said axis or axes, each said paddle being formed to provide substantial sealing engagement with the opposed inner faces of the side walls of the housing, the or each paddle terminating in an outward periphery, and said rotational device being rotatable to provide rotation of the paddles about a rotational locus;

said scraper wall being arranged to form a corresponding locus in spaced relationship with respect to a portion of the locus of said paddles and extending between said side walls;

the relative disposition rotational device with respect to the housing being such that upon rotation of the paddles within the housing the outer periphery of the or each paddle engages with the inner face of said scraper wall to provide selected sealing engagement therewith;

the scraper wall and rotational device being arranged such that when immersed in water having scum floating thereon, the paddle or paddles may be rotated to become at least partly submerged and the outer periphery or peripheries thereof engage with the scraper wall to lift a portion of the water and scum above the natural level of the water, the rotational locus being selected to provide an increase in depth of the water as it is in use being lifted.

Preferably, the substantial sealing engagement is selected to provide at least partial dewatering of the scum and water being lifted by the or each paddle between the opposed inner faces of the side walls by the rotation of the paddles in use.

Preferably, the rotational device is constituted by a rotor and the scraper wall is constituted by an arcuate curved wall arranged in circumferential disposition with respect to the axis of the rotor.

Preferably, the arc of the curved wall terminates at a position which enables the dewatered scum to be ejected from the space above the paddle by natural gravitational fall. In a preferred form, the outward periphery of the some of the paddles is provided with combs or a plurality of fingers extending substantially radially, but being either resiliently flexible or terminating short of the curved wall, and the remainder of the paddles are provided with a flexible sheet extending to engage with the curved face of the curved wall. In such form, at least one face of the flexible sheet is contoured to provide the selected drainage. Where flexible combs or tines are provided, the extent of the teeth or tines of the comb or the fingers are such that they may be deflected by their engagement with the curved wall to collectively provide the selected sealing engagement. Accordingly, in a preferred form, some of the paddles are provided with a higher degree of sealing than others. Preferably, two or three paddles are provided with the comb-like extremities, followed by a paddle having the contoured flexible sheeting having a more limited leakage.

As an alternative to the rotor, the rotational device may be constituted by a belt having the paddles extending outwardly and the belt being rotatable about two or more rollers. The scraper wall is shaped to provide the spaced disposition with respect to the locus of the paddles along the path of the belt around the rollers.

In another aspect, the present invention resides broadly in a method of separating scum from a liquid including:
  directing the liquid and scum into separating apparatus having fixed and moving walls;
  lifting a portion of said liquid and scum above the natural level of the liquid and scum between fixed and moving walls of the separating apparatus;
  permitting some of the liquid to fall from the liquid and scum between the fixed wall or walls and the moving wall or walls to provide a dewatered scum at least partly dewatered of the liquid; and
  removing the at least partly dewatered scum from the separating apparatus.

Preferably, some of the liquid and scum is permitted to fall between the fixed wall and one or more moving walls to a greater degree than other one or more moving walls. Preferably, the fixed and moving walls of the separating apparatus form respective parts of the housing and paddle or paddles as hereinbefore described.

In another aspect, the present invention resides broadly in a method of separating scum from a liquid including:
  directing the liquid and scum into separating apparatus having fixed and moving walls;
  lifting a portion of said liquid and scum above the natural level of the liquid and scum between fixed and moving walls of the separating apparatus;
  permitting some of the liquid to fall from the liquid and scum between the fixed wall or walls and the moving wall or walls to provide a dewatered scum at least partly dewatered of the liquid;
  increasing the depth of the portion of said liquid and scum by constraining said portion to an adjusted shape;
  removing the at least partly dewatered scum from the portion of said liquid.

Preferably, the scum is de-aerated by being fed through chambers having pulsating pressure variations. For example, the method may include feeding the scum through a diaphragm pump or the like.

BRIEF DESCRIPTION OF THE DRAWINGS

In order that the invention may be more readily understood and put into practical effect, reference will now be made to the following drawings which illustrate a preferred embodiment of the invention and wherein.

DETAILED DESCRIPTION OF THE DRAWINGS

Figure 1:
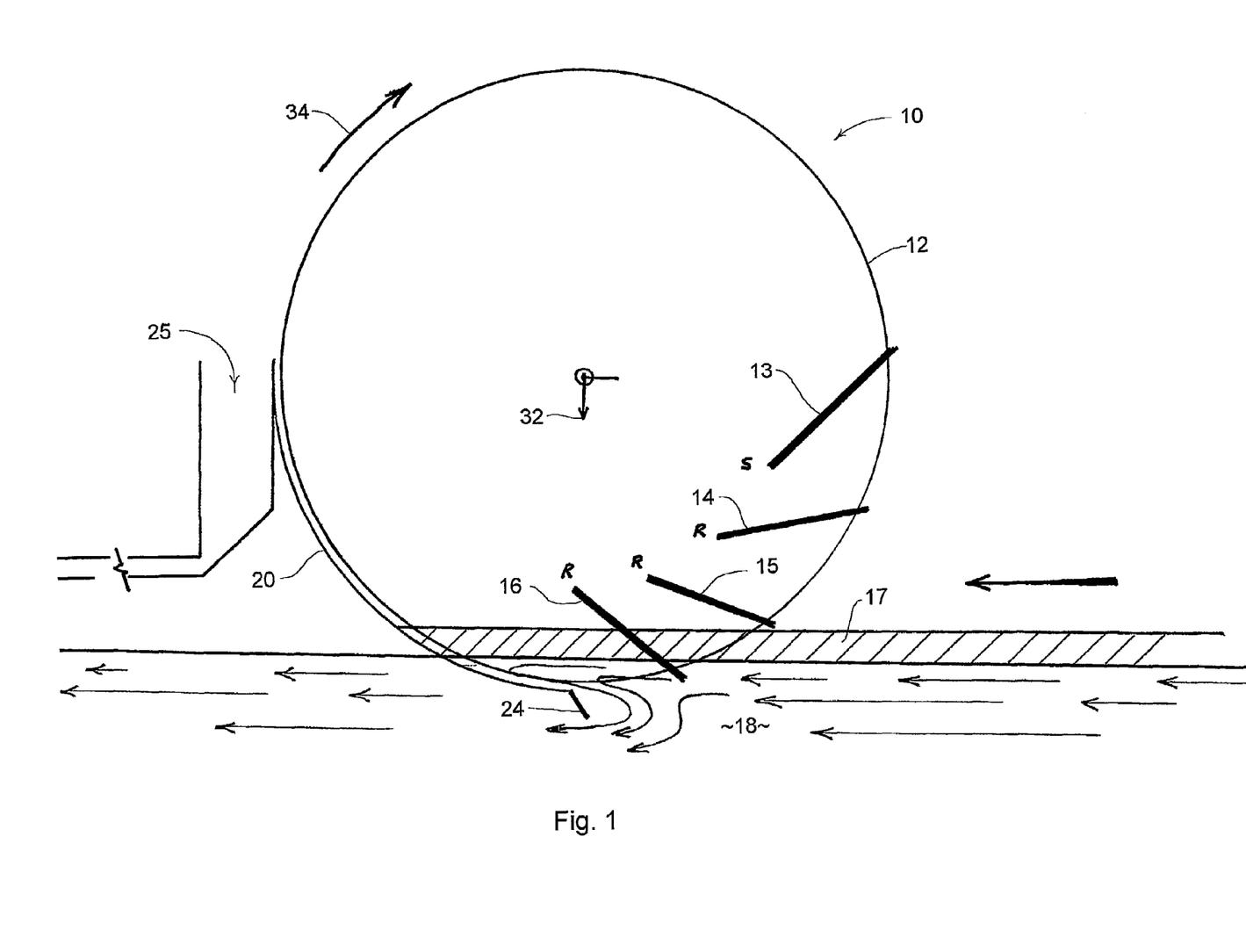
FIG. 1 is a diagrammatic side view of a paddle assembly for separation apparatus according to the invention.
Figure 2:
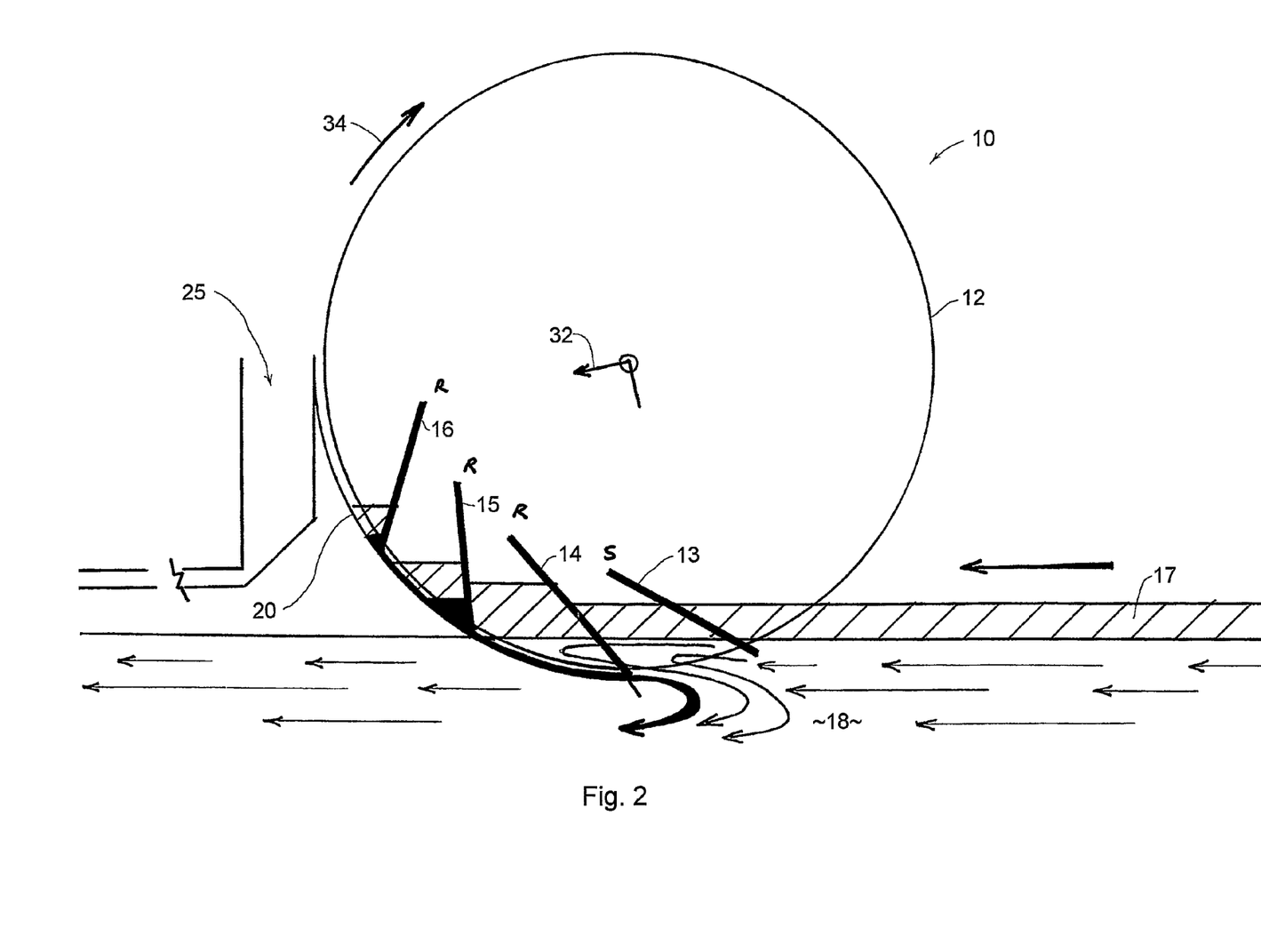
FIG. 2 is a diagrammatic side view of the apparatus of FIG. 1 with the paddle assembly in a different orientation.
Figure 3:
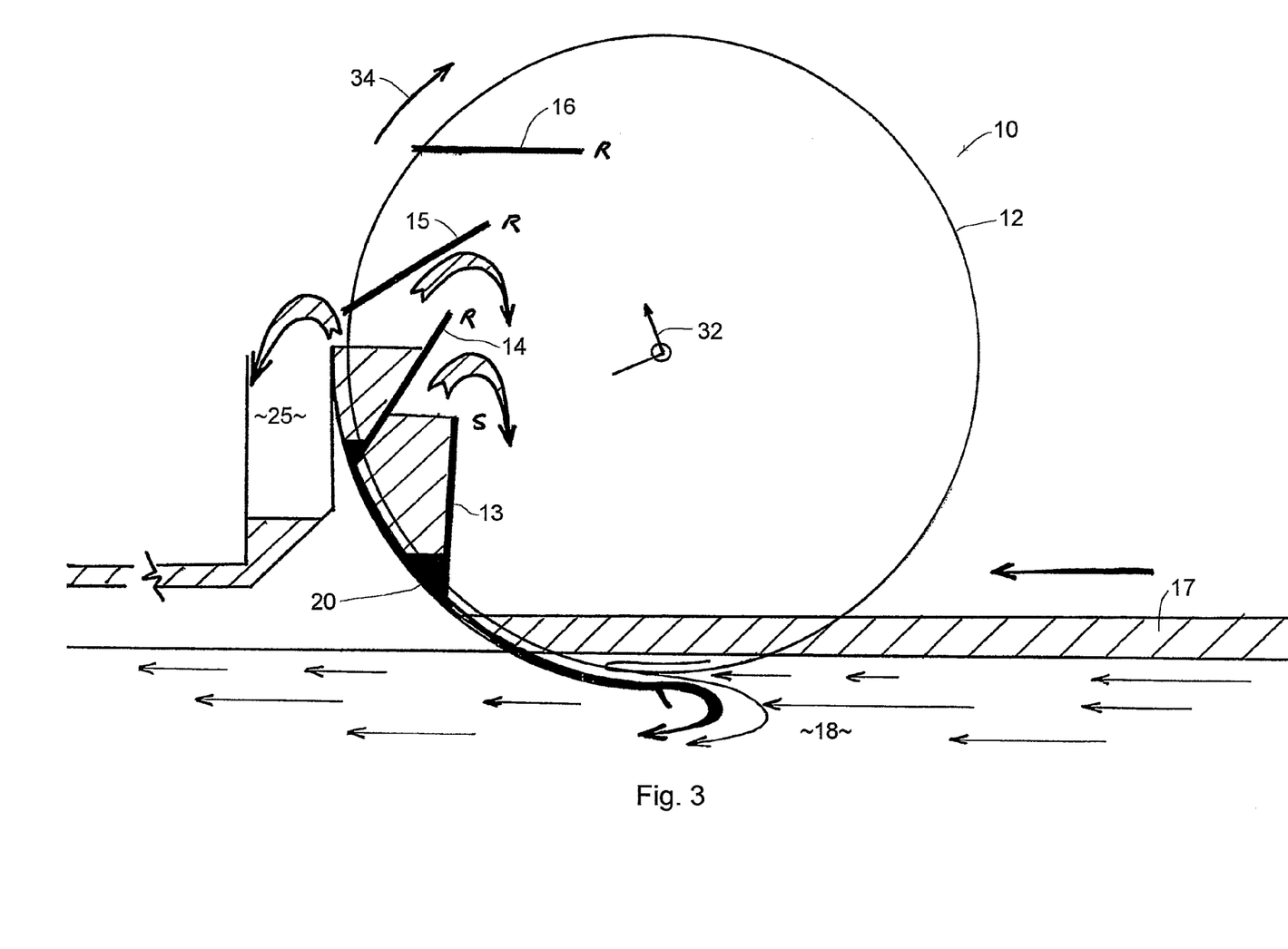
FIG. 3 is a diagrammatic side view of the apparatus of FIGS. 1 and 2 the paddle assembly in an orientation different from that of FIGS. 1 and 2.
Figure 4:
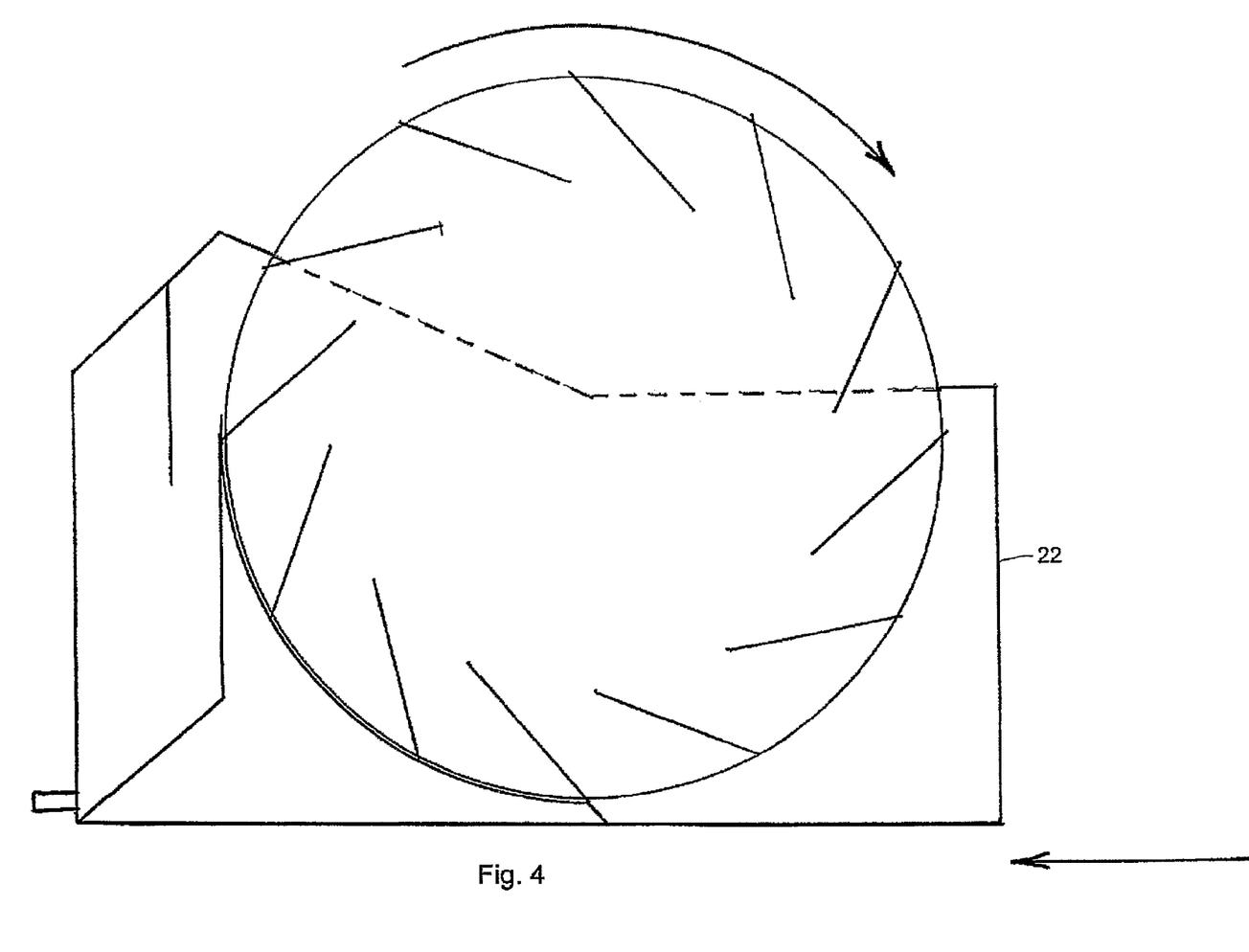
FIG. 4 is a diagrammatic side view of the apparatus incorporating the paddle assembly of FIGS. 1 to 3, but showing the arrangement of the housing.

In the Figs. for clarity, reference numerals for the various elements of the apparatus are not always indicated even though such elements may be illustrated in a particular Fig. The rotor 12 for separation apparatus 10 shown in FIGS. 1 to 7 includes plurality of paddles, four of which are shown with reference numerals 13, 14, 15 and 16 in FIGS. 1 to 3. The paddles are arranged at an angle skewed to radial with a circumferential component such that the inner edges of the paddle precede the outer peripheral edges in the direction of rotation shown by arrow 34. The faces of the paddles have a substantially constant circumferential component in the axial direction and are substantially planar.

The rotor is rotated in the direction shown in order to engage with a curved wall 20 in order to capture scum between the leading face of each paddle and the trailing face of the paddle in front of it. In each of FIGS. 1 to 3, the rotor is shown with four of the paddles in a previous position of rotation respectively and as indicated by a reference arrow 32. The four paddles form a set in which those marked "R" (that is, those having reference numerals 14, 15 and 16) are "rake" type paddles having fixed fingers or tines akin to a rake along the outward peripheries, and that marked "S" (that is, the paddle with reference numeral 13) is a "scraper" type paddle having a contoured flexible sheet along its outward periphery. The scum 17 is picked up from atop the liquid 18 and by virtue of the change in geometric shape of the body of liquid retained between the paddles during rotation, the scum becomes thicker, the depth of the volume defined by the paddle and the curved wall becoming greater as the paddle is moved along the curved wall.

Moreover, at least a portion, but normally all, of the water and possibly some of the scum as well escapes at a predetermined rate from between the peripheral edge of each paddle and the curved wall as shown by arrow 31, the escape being greater in the case of the rake type paddles than that of the scraper type paddles. As the rotor rotates with the paddles, excess material may pour over the inner edge into the space behind and between the succeeding paddle until just past the position of the paddles shown at 14 in FIG. 3, particularly if an equipment failure or shut-down prevents scum from being removed downstream in the process. As the paddles pass through the position shown at about the paddle 15, they reach the upper extent of the curved wall to permit any scum retained thereon to slide off the leading face of the paddle in the direction shown by arrow 33.

A scum collection chamber 25 shown in FIGS. 1 to 4 forms part of a housing 22 (not shown in FIGS. 1 to 4) in which the rotor is mounted. The paddles are mounted between two parallel circular side plates. It can be seen that there is a gap between the periphery of the circular side plates of the rotor between which the paddles are mounted and the curved wall of the housing, the paddles extending past the periphery of the side plates of the rotor such that only a portion of the peripheral extremity of the rotor is required to seal against the curved wall and part of the sides of the housing. Additionally, a forward lip 24 is preferably provided at approximately 45° downwards from the leading edge of the curved wall to engage with the flexible fingers attached to the peripheral edges of each paddle.

Figure 5:
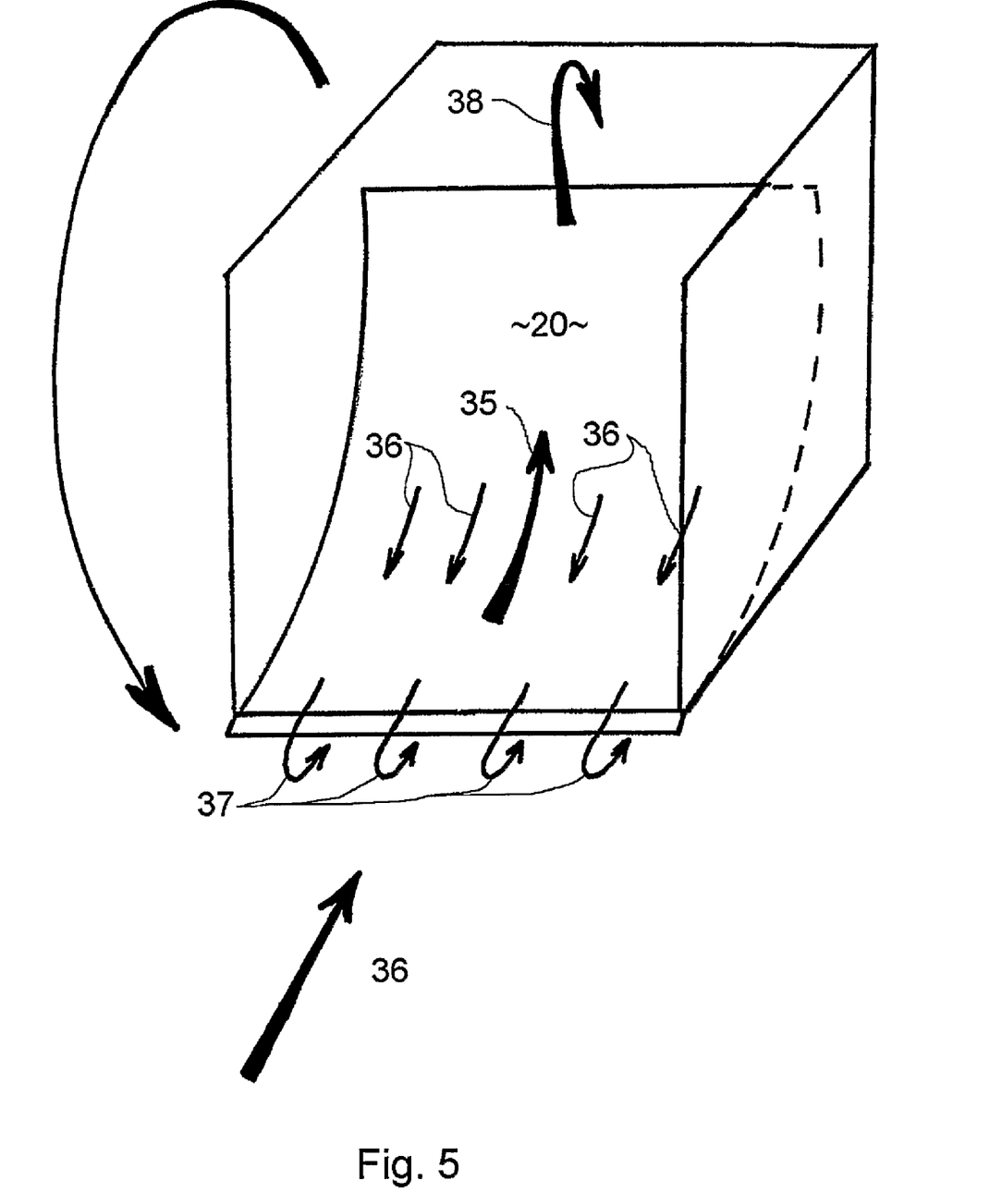
FIG. 5 is a diagrammatic pictorial view of part of the apparatus of FIGS. 1 to 4
Figure 6:
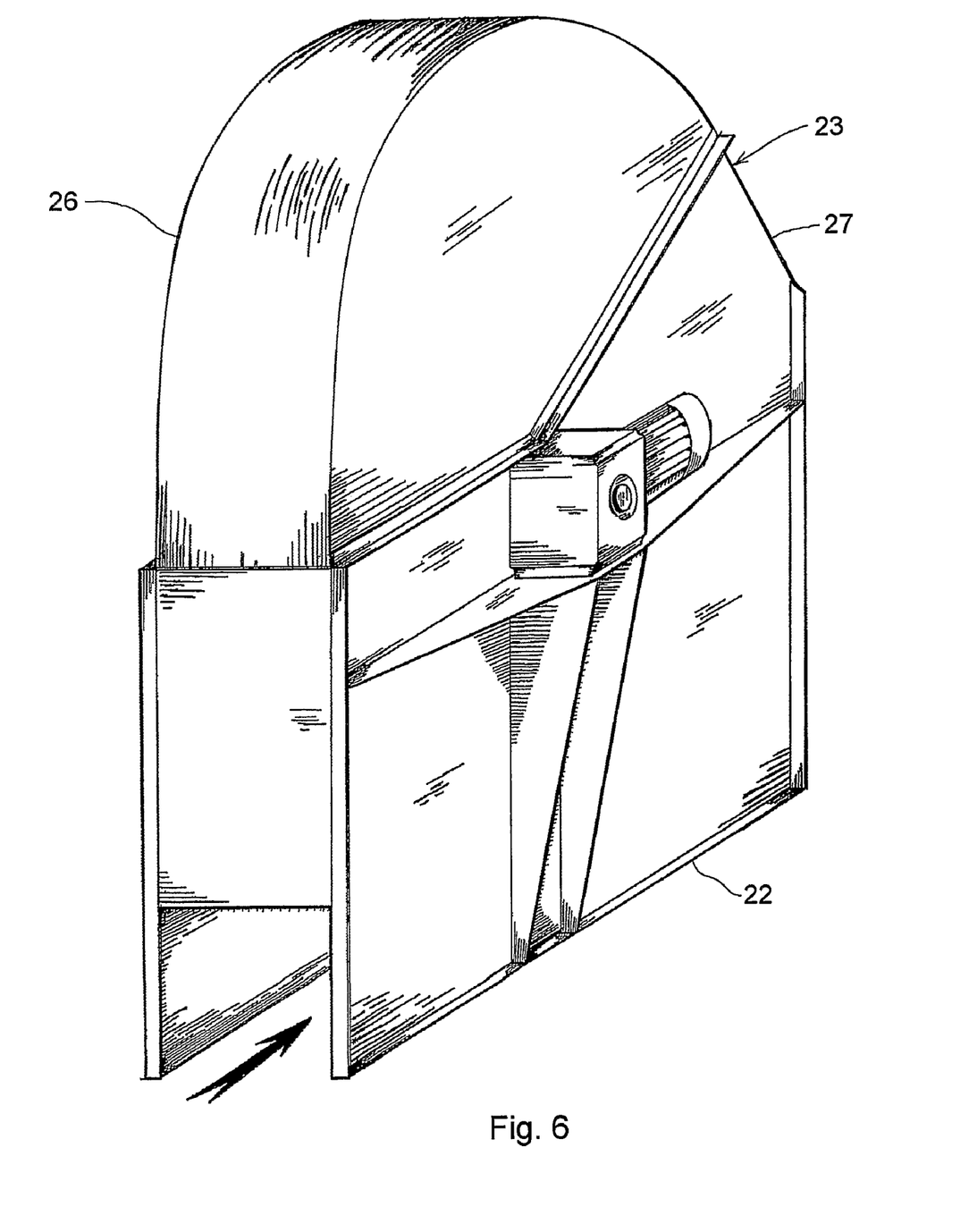
FIG. 6 is a pictorial view generally of separation apparatus according to the invention.
Figure 7:
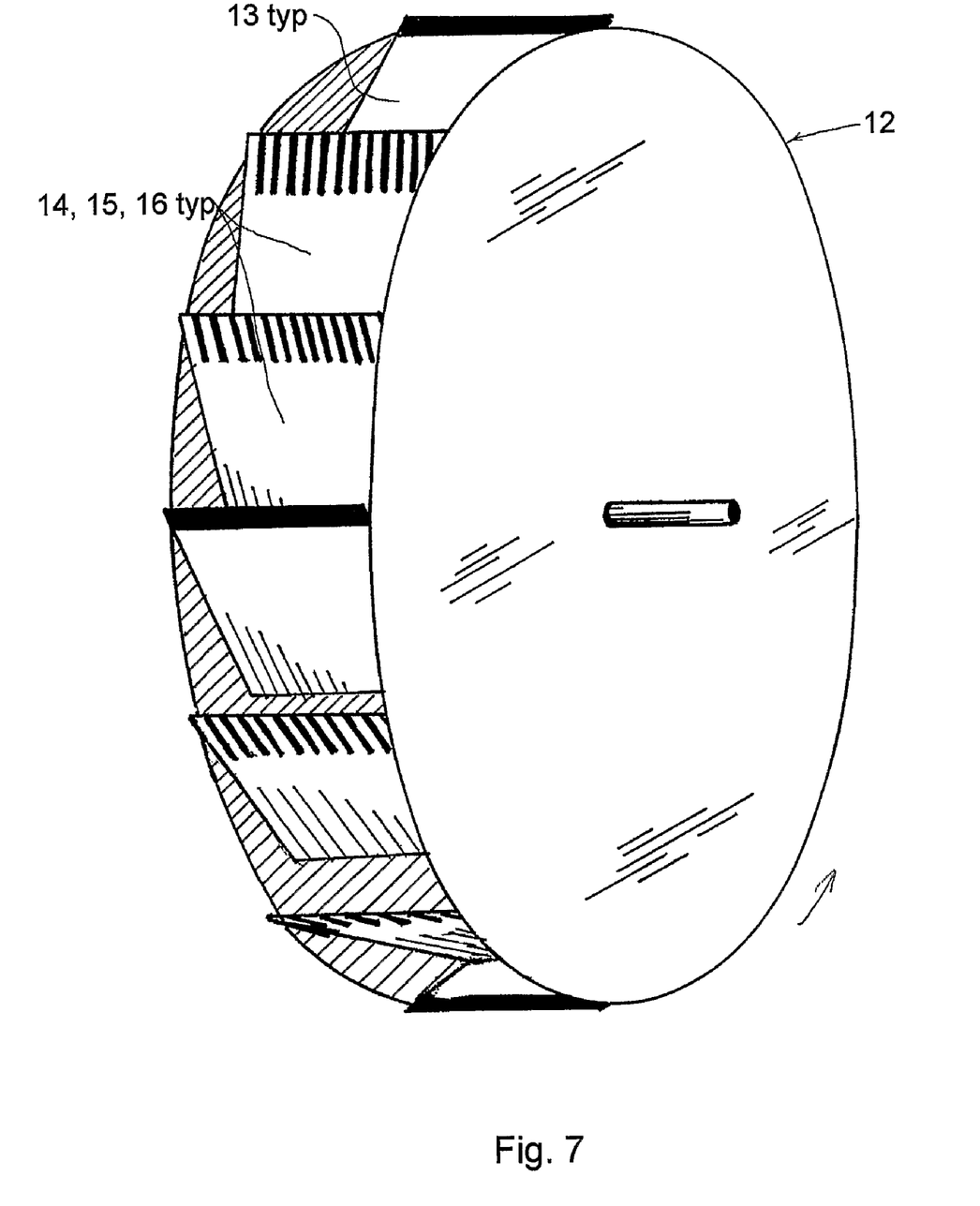
FIG. 7 is a pictorial view of the paddle assembly shown in FIGS. 1 to 4 for the separation apparatus of FIG. 6.

Referring to FIG. 5 showing the curved wall in particular, scum is guided up the wall in the direction of arrows 35 whilst water is permitted to drain therefrom and run down the curved wall as represented by arrows 36. The drained water continues along with the remainder of the water as indicated by arrows 37, and the scum is discharged over the upper edge of the curved wall as represented by the arrow 38. Referring to FIG. 6 in particular, the separation apparatus is enclosed within the housing 22 up to about the axle level of the rotor, and the upper portion of the rotor is enclosed in a cover 23 extending also over the top of the scum collection chamber. The cover is in two parts: an upper cover 26 and a lower cover 27, the upper cover being detachable from the lower cover to provide access to the rotor.

Additionally, it has been found that in the channel leading to the feed inlet for the separation apparatus of the present invention, scum can collect on the side walls. However, provision of a spray system spraying water from beneath the scum against the side walls has surprisingly been found to detach the scum from the side walls and allow the scum to train into a slick with side edges spaced from the side walls of the feed channel. Advantageously, this permits better flow of scum with the water underneath to afford the separation apparatus of the present invention the opportunity to pick the scum off the surface of the water, draining most of the water (and possibly some of the scum) back to the feed stream with a dynamic equilibrium being substantially established as the rotor rotates such entry of the scum into the rotor is streamlined. It is believed such an arrangement advantageously permits better efficacy to provide a relatively dewatered scum from the scum collection chamber.

In one form, the spray may be provided by a perforated pipe running axially along the channel above the liquid level, the perforations being spaced to enable the liquid to spread out across the face of the sides of the channel when it strikes thereagainst. In another form, preferred because it uses less liquid, the spray is provided by having two pipes, tube or hoses having a flange extending radially downward and having perforations along the tube in proximity to the proximal edge of the flange, permitting the liquid to be guided down the flange. In use the tubes are mounted such that the flanges engage with the side faces of the channel to wet same and perform the scum removal action.

In use, it has also be found that discharging scum from the scum collection chamber is advantageously performed using a diaphragm pump. The pulsatory action or some other mechanism has been found to de-aerate the scum to a more concentrated form, that is, having less air.

Although the invention has been described with reference to specific examples, it will be appreciated by persons skilled in the art that the invention may be embodied in other forms which within the broad scope and ambit of the invention as defined by the following claims.

The invention claimed is:

1. Apparatus for the separation of scum from a liquid including:

a housing incorporating two side walls in spaced relationship and each having an inner face facing the inner face of the other side wall substantially parallel to one another and a scraper wall disposed between said side walls, a rotational device mounted in said housing for providing substantially rotational motion about one or more substantially horizontal axes;

said rotational device including one or more paddles extending outwardly with respect to said one or more axes, each of the one or more paddles being formed to provide substantial sealing engagement with the opposed inner faces of the side walls of the housing, each of the one or more paddles terminating in an outward periphery, and said rotational device being rotatable to provide rotation of the one or more paddles about a rotational locus;

said scraper wall being arranged to form a corresponding locus in spaced relationship with respect to a portion of the locus of said paddles and extending between said side walls, the relative disposition rotational device with respect to the housing being such that upon rotation of the paddles within the housing the outer periphery of the or each paddle engages with the inner face of said scraper wall to provide selected sealing engagement therewith;

the scraper wall and rotational device being arranged such that when immersed in water having scum floating thereon, the paddle or paddles may be rotated to become at least partly submerged and the outer periphery or peripheries thereof engage with the scraper wall to lift a portion of the water and scum above the natural level of the water, the selected sealing engagement being selected to provide at least partial dewatering of the scum and water being lifted by the or each paddle between the opposed inner faces of the side walls by the rotation of the paddles in use.

2. Apparatus according to claim 1, wherein the rotational locus is selected to provide an increase in depth of the water being lifted.

3. Apparatus according to claim 1, wherein the one or more paddles includes a plurality of paddles, wherein some of the plurality of paddles are provided with a higher degree of sealing than other paddles.

4. Apparatus according to claim 1, wherein the one or more paddles includes a plurality of paddles, an outward periphery of the some of the plurality of paddles being provided with a plurality of fingers extending substantially radially, the plurality of fingers being resiliently flexible, and the remainder of the plurality of paddles being provided with a flexible sheet extending to engage with the curved face of the curved wall.

5. Apparatus according to claim 1, wherein the one or more paddles includes a plurality of paddles, an outward periphery of some of the plurality of paddles being provided with a plurality of fingers extending substantially radially, the fingers terminating short of the curved wall, and the remainder of the plurality of paddles being provided with a flexible sheet extending to engage with the curved face of the curved wall.

6. Apparatus for the separation of scum from a liquid comprising: a housing having two side walls substantially parallel to one another, each sidewall having an inner face facing the other and a scraper wall disposed between said side walls; a rotational device mounted in said housing for providing substantially rotational motion about one or more substantially horizontal axes; said rotational device including one or more paddles extending outwardly with respect to said axis or axes, each said paddle being formed to provide substantial sealing engagement with the opposed inner faces of the side walls of the housing, the one or more paddles terminating in an outward periphery, and said rotational device being rotatable to provide rotation of the one or more paddles about a rotational locus, said scraper wall being arranged to form a corresponding locus in spaced relationship with respect to a portion of the locus of said paddles and extending between said side walls, the relative disposition of the rotational device with respect to the housing being such that upon rotation of the one or more paddles within the housing, the outer periphery of the one or more paddles engages the inner face of said scraper wall to provide selected sealing engagement therewith; the scraper wall and rotational device being arranged such that when immersed in water having scum floating thereon, the one or more paddles can be rotated to become at least partly submerged and the outer periphery or peripheries thereof engage the scraper wall to lift a portion of the water and scum above the natural level of the water, the rotational locus being selected to provide an increase in depth of the water being lifted.

7. Apparatus according to claim 6, wherein the substantial sealing engagement is selected to provide at least partial dewatering of the scum and water being lifted by the or each paddle between the opposed inner faces of the side walls by the rotation of the paddles in use.

8. Apparatus according to claim 6, wherein the rotational device includes a rotor, and the scraper wall includes an arcuate curved wall arranged in circumferential disposition with respect to the axis of the rotor.

9. Apparatus according to claim 6, wherein the one or more paddles includes a plurality of paddles, and wherein some of the plurality of paddles are provided with a higher degree of sealing than other paddles.

10. Apparatus according to claim 6, wherein the one or more paddles includes a plurality of paddles, an outward periphery of some of the plurality of paddles is provided with a plurality of fingers extending substantially radially, the plurality of fingers being resiliently flexible, and the remainder of the plurality of paddles being provided with a flexible sheet extending to engage with the curved face of the curved wall.

11. Apparatus according to claim 6, wherein the one or more paddles includes a plurality of paddles, an outward periphery of some of the plurality of paddles being provided with a plurality of fingers extending substantially radially, the plurality of fingers terminating short of the curved wall, and the remainder of the plurality of paddles being provided with a flexible sheet extending to engage with the curved face of the curved wall.

12. A method of separating scum from a liquid including:
directing the liquid and scum into a separating apparatus having fixed and moving walls;
lifting a portion of said liquid and scum above the natural level of the liquid and scum between the fixed and moving walls of the separating apparatus;
permitting some of the liquid to fall from the liquid and scum between the fixed wall or walls and the moving wall or walls to provide a scum at least partly dewatered from the liquid;
removing the at least partly dewatered scum from the separating apparatus; and
wherein a portion of the liquid and scum is permitted to fall between the fixed wall and one or more moving walls to a greater degree than the other one or more moving walls.

13. A method according to claim 12, wherein the fixed and moving walls of the separating apparatus form respective parts of a housing and at least one paddle.

* * * * *

UNITED STATES PATENT AND TRADEMARK OFFICE
CERTIFICATE OF CORRECTION

| | | |
|---|---|---|
| PATENT NO. | : 7,662,297 B2 | Page 1 of 1 |
| APPLICATION NO. | : 11/632430 | |
| DATED | : February 16, 2010 | |
| INVENTOR(S) | : Bradley Desmond Leslie Murray | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 166 days.

Signed and Sealed this

Twenty-eighth Day of December, 2010

David J. Kappos
*Director of the United States Patent and Trademark Office*